US007864962B2

(12) United States Patent
Henson et al.

(10) Patent No.: US 7,864,962 B2
(45) Date of Patent: Jan. 4, 2011

(54) SYSTEM AND METHOD OF ROUTING AUDIO SIGNALS TO MULTIPLE SPEAKERS

(75) Inventors: Matthew Henson, Austin, TX (US); Daniel Mulligan, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 1478 days.

(21) Appl. No.: 11/170,487

(22) Filed: Jun. 29, 2005

(65) Prior Publication Data

US 2007/0005161 A1 Jan. 4, 2007

(51) Int. Cl.
*H04H 40/81* (2008.01)
*H04B 3/00* (2006.01)

(52) U.S. Cl. .............................. 381/11; 381/74; 381/81

(58) Field of Classification Search .................. 381/11, 381/27, 74, 123, 77, 79, 80, 81; 715/727; 455/556.1, 557, 560, 569.1
See application file for complete search history.

(56) References Cited

U.S. PATENT DOCUMENTS

| | | | | |
|---|---|---|---|---|
| 5,056,148 | A * | 10/1991 | Hayashi | 381/11 |
| 5,347,499 | A * | 9/1994 | Woo | 369/4 |
| 5,515,442 | A * | 5/1996 | Dombrowski, Jr. | 381/11 |
| 5,696,814 | A * | 12/1997 | Tran et al. | 379/110.01 |
| 6,714,796 | B1 * | 3/2004 | Mizukoshi et al. | 455/550.1 |
| 6,980,827 | B2 * | 12/2005 | Lin et al. | 455/556.1 |
| 7,043,034 | B2 * | 5/2006 | Poling et al. | 381/123 |
| 7,088,827 | B1 * | 8/2006 | Vishwamitra | 381/1 |
| 7,272,232 | B1 * | 9/2007 | Donaldson et al. | 381/55 |
| 7,373,182 | B2 * | 5/2008 | Zatloukal et al. | 455/569.1 |
| 7,502,478 | B2 * | 3/2009 | King | 381/55 |
| 7,552,389 | B2 * | 6/2009 | Drewes et al. | 715/727 |
| 7,590,233 | B2 * | 9/2009 | Chiloyan | 379/430 |
| 7,643,642 | B2 * | 1/2010 | Patino et al. | 381/120 |
| 2006/0182289 | A1 * | 8/2006 | Chu | 381/86 |

* cited by examiner

*Primary Examiner*—Xu Mei
(74) *Attorney, Agent, or Firm*—Toler Law Group

(57) ABSTRACT

A method and system for utilizing multiple speakers in a portable electronic device is disclosed. The method includes receiving an input at a user interface of a portable electronic device, switching a first and second speaker in a stereo configuration to a mono configuration by routing a first digital to analog converter (DAC) output to both the first and second speaker in response to the input and coupling a third speaker to a second DAC to receive a first audio signal that is responsive to the input. The system includes a first digital to analog converter coupled to a first speaker, a second DAC coupled to a second speaker, and a third speaker. The system further includes switching logic coupled to the first and second DACs. The switching logic is responsive to an input signal provided by a user interface of a portable device. In response to an input signal from the user interface, the switching logic couples the first and second speakers to the first DAC and the third speaker to the second DAC.

11 Claims, 3 Drawing Sheets

SYSTEM AND METHOD OF ROUTING AUDIO SIGNALS TO MULTIPLE SPEAKERS

FIELD OF THE DISCLOSURE

The present disclosure relates to routing audio signals to multiple speakers.

BACKGROUND

Portable audio devices typically incorporate multiple speakers to play audio files. A portable audio device may include a set of headphones to play music files, and a speaker to play other sounds, such as user notification alarms. In portable audio devices, it is sometimes useful to provide user feedback sounds in response to a user input. These user feedback sounds provide an auditory signal to a user to let the user know of the use of a user interface of the portable audio device. Such feedback can provide an improved user experience or can allow the user to interface with the portable audio device more effectively.

Portable audio devices typically utilize digital to analog converters to process sounds for playback over the headphones and speakers. However, each digital to analog converter uses additional space and adds cost to an integrated circuit of the portable audio device Accordingly, there is a need for a system and method for a portable audio device that is able to reduce the number of digital to analog converters needed for a multiple speaker configuration.

DETAILED DESCRIPTION OF THE DRAWINGS

A method and system of utilizing multiple speakers in a portable electronic device is disclosed. The method includes receiving an input at a user interface of a portable electronic device, switching a first and second speaker in a stereo configuration to a mono configuration by routing a first digital to analog converter (DAC) output to both the first and second speaker in response to the input and coupling a third speaker to a second DAC to receive a first audio signal that is responsive to the input.

The system includes a first digital to analog converter coupled to a first speaker, a second digital to analog converter coupled to a second speaker, a third speaker, and switching logic coupled to the first and second digital to analog converters and responsive to an input signal provided by the user interface of a portable device, the switching logic to couple the second speaker to the first digital to analog converter and the third speaker to the second digital to analog converter in response to the input signal from the user interface.

Figure 1:
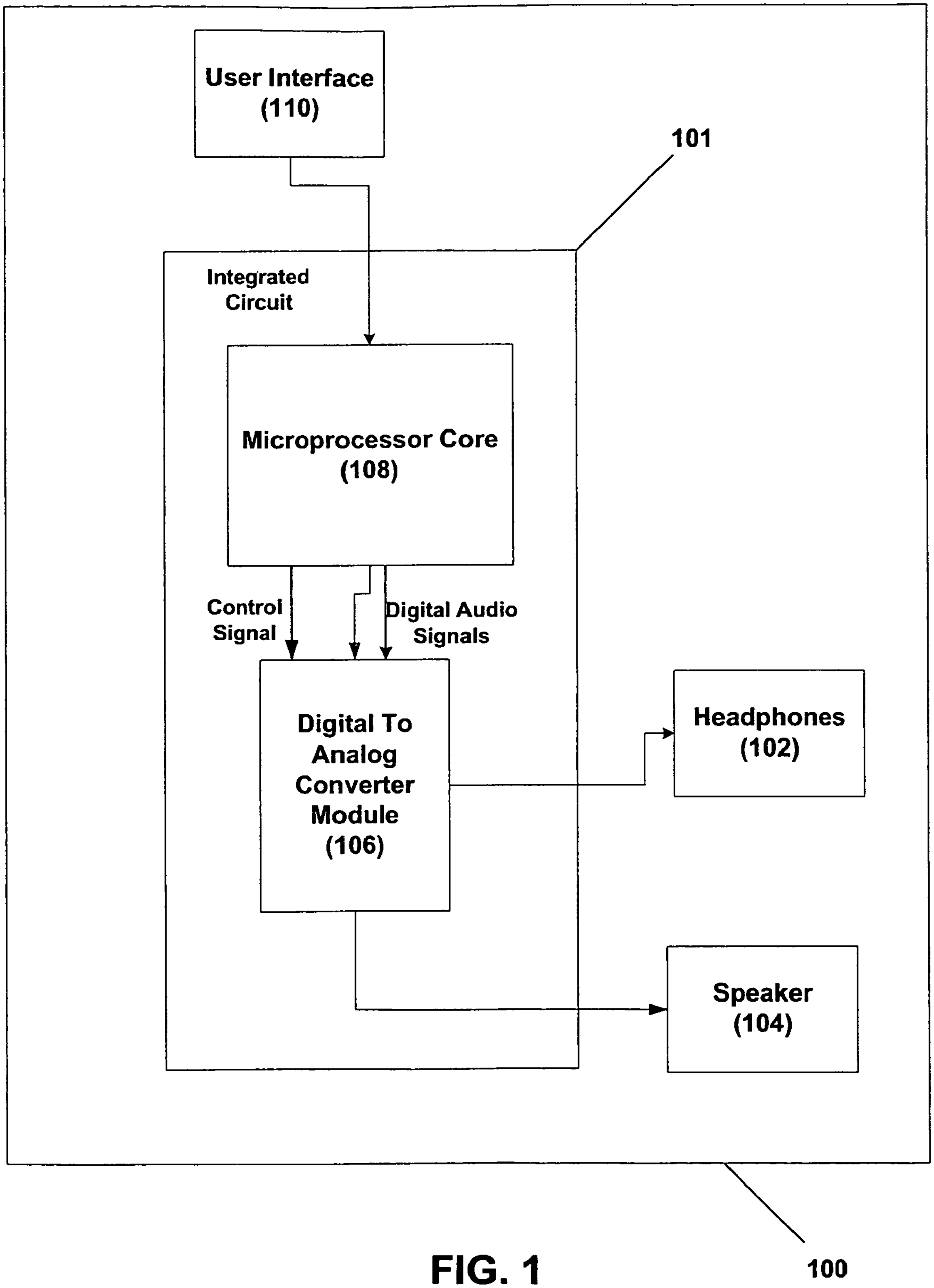
FIG. 1 is a block diagram of a portable audio device utilizing multiple speakers.

Referring to FIG. 1, a block diagram of a particular embodiment of a portable electronic device 100 is illustrated. The portable electronic device 100 includes an integrated circuit 101, a user interface 110, a set of headphones 102 and a speaker 104. In a particular embodiment, the portable electronic device 100 is a portable music player. In a particular embodiment, the portable electronic device 100 is capable of storing and playing digital music files, such as MP3 files.

The integrated circuit 101 includes a digital to analog converter module 106 and a microprocessor core 108. The integrated circuit 101 is connected to the user interface 110, the headphones 102, and the speaker 104. The user interface 110 is able to send signals to the integrated circuit 101 in response to a user input from the user interface 110. The user interface 110 may be any kind of user interface of a portable electronic device, including a button, a selector wheel, switch, touchpad or other appropriate device.

The integrated circuit 101 can be used to process audio files and output those files in an analog format for audible playback over the headphones 102. In a particular mode of operation, the headphones 102 can be operated in a stereo configuration, where the headphones include two speakers, each capable of independent audio output. The integrated circuit 101 can also generate system notification sounds, such as user feedback sounds, and output those sounds to the headphones 102 and to the speaker 104. An example of user feedback sounds is a series of clicking sounds, such as clicks that indicate movement of a selector wheel by the user.

In a particular embodiment, the microprocessor core 108 is capable of storing audio files, and is further capable of processing those audio files in response to an input from the user interface 110. In a particular embodiment, a user can select a particular audio file using the user interface 110. The user may also initiate audible playback of a particular audio file using the user interface 110. The microprocessor core 108 can also perform other functions, such as generating the user feedback sounds. The microprocessor core 108 can also combine the audio files and the user feedback sounds to integrate those sounds together in an appropriate fashion.

The feedback sounds and processed audio files are provided in a digital format to the digital to analog converter module 106. The microprocessor core 108 also provides a control signal to the digital to analog converter module 106. Based on this control signal, the digital to analog converter module 106 determines whether the headphones 102 and/or the speaker 104 will be used to play the audio output. The digital to analog converter module 106 converts the user feedback sounds and the processed audio files provided by the microprocessor core 108 from digital format to analog format, and provides analog signals representing the combination of the feedback sounds and the processed audio files to the headphones 102 and/or the speaker 104.

Figure 2:
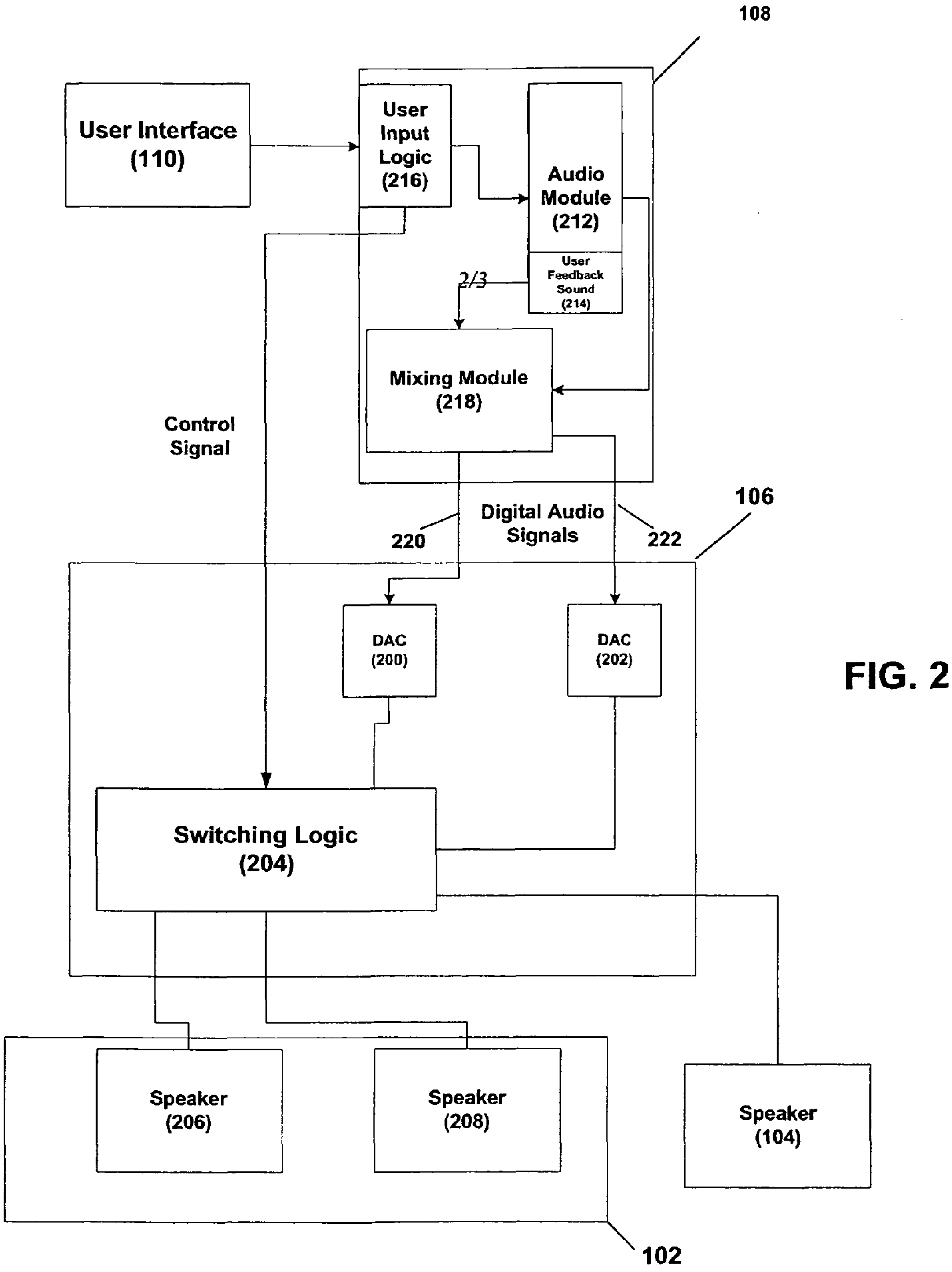
FIG. 2 is a block diagram of an integrated circuit of a portable audio device utilizing digital to analog converters for processing digital audio files.

Referring to FIG. 2, a block diagram of a particular embodiment of the microprocessor core 108 and the digital to analog converter module 106 is illustrated. The microprocessor core 108 includes user input logic 216, an audio processing module 212, and an audio mixing module 218. The audio processing module 212 stores or is capable of producing a selected user feedback sound 214. The audio processing module 212 also stores digital audio files, such as MP3 files, and processes these files for playback. The user input logic 216 is responsive to the user interface 110, and is coupled to the audio processing module 212. The audio processing module 212 is coupled to the audio mixing module 218.

The digital to analog converter module 106 includes a first digital to analog converter (DAC) 200, a second digital to analog converter 202, and switching logic 204. The DACs 200 and 202 are responsive to the audio mixing module 218. The switching logic 204 is coupled to the DACs 200 and 202 and to a control signal from the user input logic 216.

In response to a user input at the user interface 110, the user input logic 216 within the microprocessor core 108 provides a signal to the audio processing module 212. Based on this signal, the audio processing module 212 can select from a range of possible actions. For example, the audio processing module 212 can rewind a digital audio file, fast forward through the file, or play the file. In response to the control signal from the user input logic 216, the audio processing module 212 can also generate the user feedback sound 214 in a digital audio signal format.

The audio processing module 212 is coupled to the audio mixing module 218. The audio mixing module 218 is capable of integrating digital audio signals together. The audio mixing module 218 may also modulate the volume, frequency, phase, or other characteristic of the multiple digital audio signals when mixing those signals to produce a combined digital audio signal. In an embodiment, the audio mixing module 218 is capable of mixing multiple digital audio signals together in a fade configuration. In another embodiment, the audio mixing module 218 is capable of mixing multiple digital audio signals together in a zero-crossing configuration. In another particular embodiment, the audio mixing module 218 may be an analog mixing module disposed between the digital to analog converters 200 and 202 and the switching logic 204.

The audio mixing module 218 receives digital audio signals, including the user feedback sound 214, from the audio processing module 212. The audio mixing module 218 mixes the user feedback sound with the processed digital audio files stored at the audio processing module 212. The audio mixing module 218 also generates multiple streams of digital output based on the combined digital audio signal. For example, in a stereo configuration, the audio mixing module 218 can output separate digital audio output streams for the left and right speaker channels.

The outputs, such as a first digital audio signal 220 and a second digital audio signal 222, of the audio mixing module 218 are provided to the first DAC 200 and the second DAC 202, respectively. Both DACs are coupled to the switching logic 204. The switching logic 204 receives a control signal from the user input logic 216. The user input logic 216 generates the control signal based on the presence or absence of an input at the user interface 110.

The switching logic 204 is connected to the headphones 102, which include a first speaker 206 and a second speaker 208. The switching logic 204 is also connected to a third speaker 104. Based on the control signals provided by the user input logic 216, the switching logic 204 connects the outputs of the first DAC 200 and the second DAC 202 to one or more of the speakers 206, 208 and 104.

In a particular embodiment, the switching logic 204 couples the first speaker 206 and the second speaker 208 to the first DAC 200 and the third speaker 104 to the second DAC 202 in response to a first input signal from the user interface 110. In a particular embodiment, the user interface 110 is a button, and the first input signal is triggered in response to a user activation of the button. Accordingly, the control signal provided by the user input logic 216 controls a particular mode of operation of the switching logic 204. For example, in a first mode of operation, the first input of the switching logic 204 (provided by DAC 200) is coupled to the first speaker 206 and the second input (provided by DAC 202) of the switching logic 204 is coupled to the second speaker 208. In a second mode of operation the first input of the switching logic 204 is coupled to the first and second speakers 206 and 208 in a mono configuration, and the second input is coupled to the third speaker 104.

Figure 3:
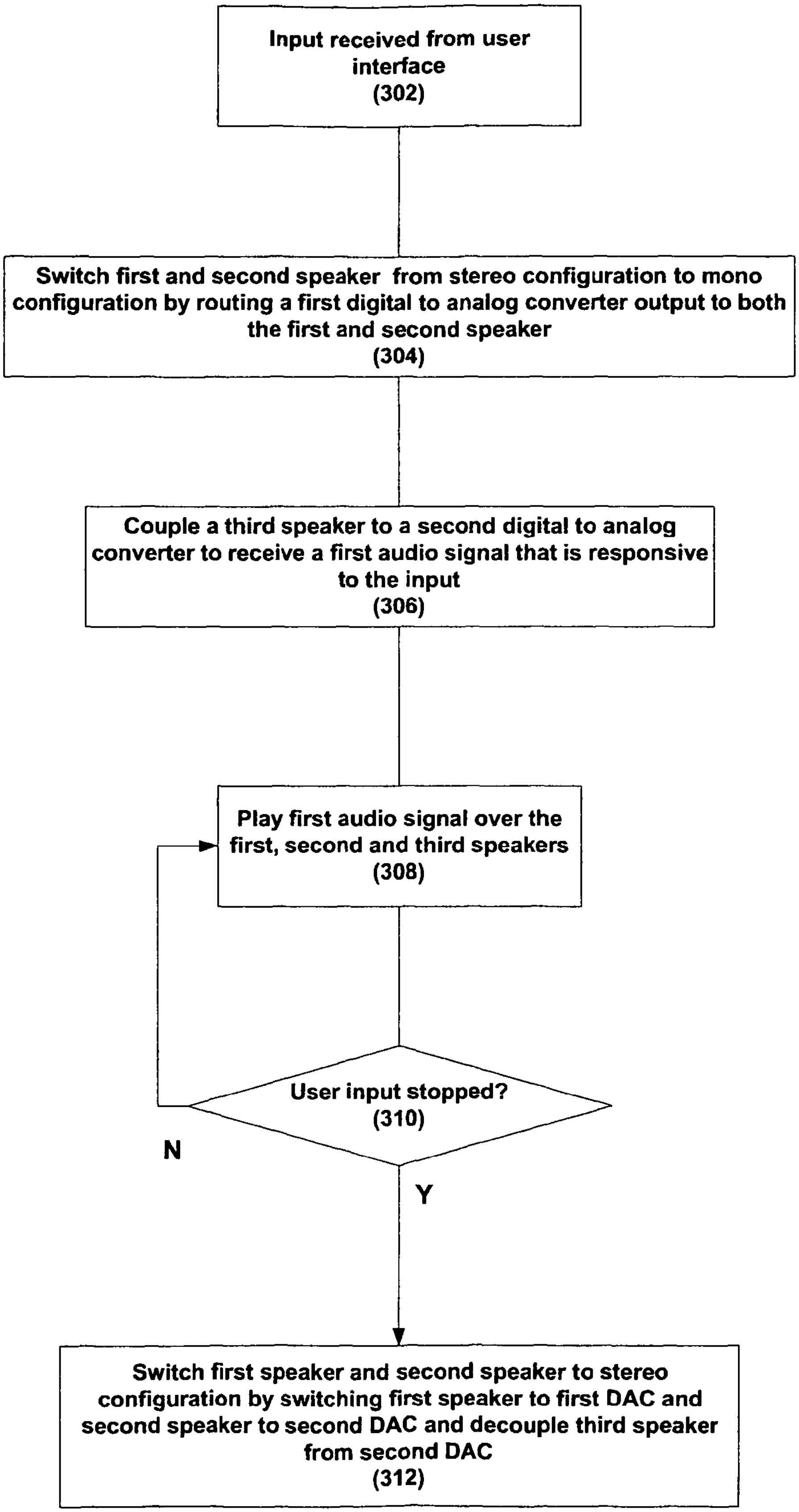
FIG. 3 is a flow chart of a method of using multiple digital to analog converters and multiple speakers.

Referring to FIG. 3, a method for configuring the speakers of a portable electronic device in response to a user input is illustrated. At step 302, a user input is received at a user interface of the portable electronic device. In a particular embodiment, the user interface can be a button, a selector wheel, a touchpad, or a switch. The first and second speakers of the portable electronic device are switched from a stereo configuration to a mono configuration at step 304 by initially routing a first and second digital to analog converter output to two different speakers and then routing the first digital analog converter to both the first and second speaker in response to the input. In an embodiment, the first and second speakers are headphone speakers.

At step 306, after transition to the mono configuration, a third speaker is coupled to the output of the second digital to analog converter to receive a first audio signal that is responsive to the input at the user interface. In a particular embodiment, the first audio signal is a user feedback sound. In a particular embodiment, the first audio signal may be selected by a user.

The first audio signal is played over the first, second and third speakers at step 308 by providing the audio signal to the first and second digital to analog converters. The converters transform the audio signal to an analog form and provide the analog signal to the first, second and third speakers. In a particular embodiment, the first audio signal is mixed with a second audio signal provided to the first and second speakers. The audio signal is processed by an audio mixing module to integrate the first and second audio signals together into a mixed audio signal. The mixed audio signal is then provided to the first digital to analog converter, which converts the mixed audio signal from a digital format and provides the signal to the first and second speakers. The second audio signal may be produced based on a digital audio file, such as an MP3 file. In a particular embodiment, the first and second audio signals are mixed in a fade configuration. In another embodiment, the first and second audio signals are mixed in a zero-crossing configuration.

At step 310, a determination is made whether termination of the input from the user interface is detected. If the input has been terminated, the first and second speakers are switched back to a stereo configuration, at step 312, by switching the first speaker to the first DAC and the second speaker to the second DAC and by decoupling the third speaker from the second DAC. The second audio signal may then continue to be played over the first and second speakers. The second audio signal may be processed into a stereo format, including separate first and second stereo audio signals for the first and second speakers, respectively. The first stereo signal is provided to the first DAC to be provided to the first speaker, while the second stereo signal is provided to the second DAC to be provided to the second speaker.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:

routing a first audio signal from a first output of a first digital to analog converter to a first speaker;

routing a second audio signal from a second output of a second digital to analog converter to a second speaker, wherein the second audio signal is different than the first audio signal, and wherein the first speaker and the second speaker are in a stereo configuration;

receiving a user input at a user interface of a portable electronic device;

switching the first speaker and the second speaker in the stereo configuration to a mono configuration by re-routing the output of the first digital to analog converter to both the first speaker and the second speaker in response to the user input; and coupling a third speaker to the second digital to analog converter to receive the second audio signal that is responsive to the user input.

2. The method of claim 1, further comprising playing the second audio signal over the first, second, and third speakers in response to the user input.

3. The method of claim 2, wherein the first audio signal is selectable by a user.

4. The method of claim 2, further comprising mixing the first audio signal with the second audio signal provided to the first and second speakers, and wherein the second audio signal is produced based on a digital audio file.

5. The method of claim 4, wherein the digital audio file is an MP3 file.

6. The method of claim 4, wherein the first and second audio signals are mixed in a fade configuration.

7. The method of claim 4, wherein the first and second audio signals are mixed in a zero-crossing configuration.

8. The method of claim 1, further comprising switching the first and second speakers to a stereo configuration after detecting termination of the user input.

9. The method of claim 1, wherein the user interface is selected from the group of a selector wheel, a switch, or a touchpad.

10. The method of claim 1, wherein the user interface is a button, and wherein the user input is a signal triggered in response to a user activation of the button.

11. The method of claim 1, wherein the first and second speakers are headphone speakers.

* * * * *